July 5, 1932. J. L. JACKSON 1,865,521
MOTOR CULTIVATOR
Filed Jan. 8, 1930 2 Sheets-Sheet 1
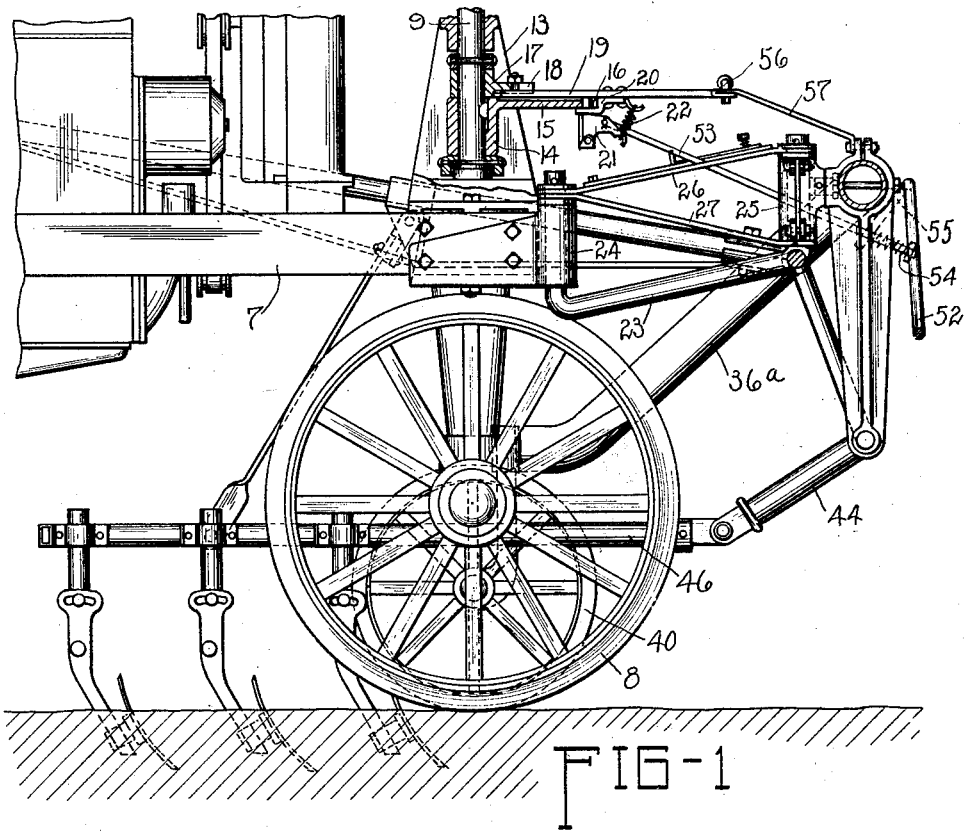

July 5, 1932.   J. L. JACKSON   1,865,521
MOTOR CULTIVATOR
Filed Jan. 8, 1930   2 Sheets-Sheet 2

WITNESS
Walter Ackerman

INVENTOR
John L. Jackson,
BY Brown, Jackson, Boettcher & Dienner.
ATTORNEYS

Patented July 5, 1932

1,865,521

UNITED STATES PATENT OFFICE

JOHN L. JACKSON, OF CHICAGO, ILLINOIS, ASSIGNOR TO DEERE & COMPANY, OF MOLINE, ILLINOIS, A CORPORATION OF ILLINOIS

MOTOR CULTIVATOR

Application filed January 8, 1930. Serial No. 419,292.

This invention has to do with the adaptation of farm tractors to the performance of work of different kinds about the farm, and has particularly to do with the convenient application to such a tractor of devices for tilling the soil, such as cultivating tools, although by suitable alteration of certain parts of the attachment it may be used to connect other appropriate implement tools to the tractor. For the purpose of explaining the invention, it is shown in the accompanying drawings as being embodied in a cultivator attachment designed to be connected with or disconnected from the front portion of the frame of a tractor of the three-wheeled type, as the advantages of the construction are fully realized in an implement of that character.

Letters Patent to Benjamin, No. 1,539,108, issued May 26, 1925, and No. 1,607,230, issued Nov. 16, 1926, both show the application of a cultivator attachment to the front portion of a tractor frame, the attachment being in the form of a rigid transverse draft bar which is connected with the tractor frame to move endwise, or transversely with respect to the longitudinal axis of the tractor, in conjunction with the steering of the tractor, that is to say, when the tractor is steered to the left, for example, the draft bar moves endwise in the same direction, and the cultivator beams and shovels are connected with the draft bar so that they are moved laterally in unison by its endwise movement.

The draft bar is connected with the tractor frame by two forwardly extending parallel supports that are pivotally connected at their rear ends with the tractor frame to swing laterally, and at their forward ends are connected to the draft bar by vertical pivots so that when such forwardly extending members or supports are swung laterally in unison about their pivotal connections with the tractor frame the draft bar moves endwise without altering its position at right angles to the longitudinal axis of the tractor.

The tractor shown in the Benjamin patents is of the so-called three-wheeled type, the tractor frame being supported at the rear on two propelling wheels, and its front portion being supported on two steering wheels set close together under the center of the frame so that they function as a single steering wheel. The steering wheels are turned in unison to steer the tractor by means of a manually operated wheel located near the driver's seat at the rear of the tractor and connected with the vertical spindle of the steering wheels by suitable gearing. A connection is provided between the transverse draft member and the spindle of the steering wheels, for moving the draft bar endwise when the wheels are steered, but means is provided for automatically disconnecting the draft bar from the steering wheels when the cultivator shovels are lifted out of operative position, so that for transport purposes the tractor may be steered without shifting the draft bar and cultivator rigs. At such time the laterally swinging supports for the draft bar are locked against lateral swinging by means of a diagonal bar that extends across from one support to the other and is adapted to serve the purpose of holding them against swinging movement.

In the constructions shown in the Benjamin patents referred to the draft bar is a unitary rigid member, and a pair of cultivator beams is connected with each end portion thereof so that there are two beams at each side of the tractor. While these beams may be raised or lowered by swinging them about their pivotal connections with the draft bar, owing to the rigidity of the draft bar, which prevents its end portions from swinging up and down with respect to each other, the tools are incapable of accommodating themselves to unevenness of the ground surface, and, therefore, the implement does not work efficiently over sloping or uneven ground. The present invention has to do with overcoming this objection by providing a transverse draft member comprising end portions extending at opposite sides of the tractor and pivotally connected therewith in such manner that they are free to swing up and down independently of each other and of the tractor frame, while, nevertheless, they are so mounted that when the implement is in use the draft member as a whole is capable of moving endwise transversely of the longitudinal axis of the tractor in conjunction with the turning of the steering wheels as the tractor is steered.

It has heretofore been proposed to improve cultivator attachments such as those shown in the Benjamin patents by providing a centrally articulated transverse draft member, and connecting the end portions thereof with forwardly extending supports having swiveled connection with the tractor frame so that they could turn about their own longitudinal axes, and also connected with the tractor frame by vertical pivots so that they could swing laterally, the forward ends of such supports being connected with the inner portions of the end members of the articulated draft bar in such manner that vertical swinging of such end members rotated the forwardly extending supports about their own longitudinal axes. Such construction is objectionable because it does not provide a stable support for the draft bar as a whole, and consequently the end members of the draft bar and the rigs connected with them are not held properly to their work. Such construction, also, requires that the forwardly extending supports be capable of rocking with respect to each other, which is objectionable, particularly where such supports must also be capable of swinging laterally substantially in unison.

To provide an attachment comprising a transverse draft member having end portions capable of swinging up and down independently of each other, in connection with stable supporting means for connecting the draft member with the frame of a tractor, such supporting means being capable of swinging laterally in conjunction with the steering of the tractor, but having no swiveling movement with respect to the tractor frame, so that the draft member and the rigs connected therewith will be properly supported from the tractor frame, is the object of the present invention. I accomplish this object as illustrated in the drawings and hereinafter described. What I regard as new is set forth in the claims.

In the accompanying drawings,—which show my improvements applied to a cultivator attachment constructed generally as shown and described in Benjamin Patent No. 1,539,180,—

Fig. 1 is a side view showing the forward portion of a tractor in elevation, certain parts of the attachment being shown in elevation and other parts in section on line 1—1 of Fig. 3;

Fig. 2 is a partial front elevation of one form of the attachment in which the draft member is in the form of an articulated bar or tube comprising two end portions pivotally connected adjacent to their inner ends to forwardly extending supports so as to be capable of swinging relatively thereto about vertical axes, and also up and down, and having their inner ends connected by an intermediate link which is not itself connected to said supports;

Fig. 4 is an enlarged detail, being a partial vertical section on line 4—4 of Fig. 3;

Figure 3:
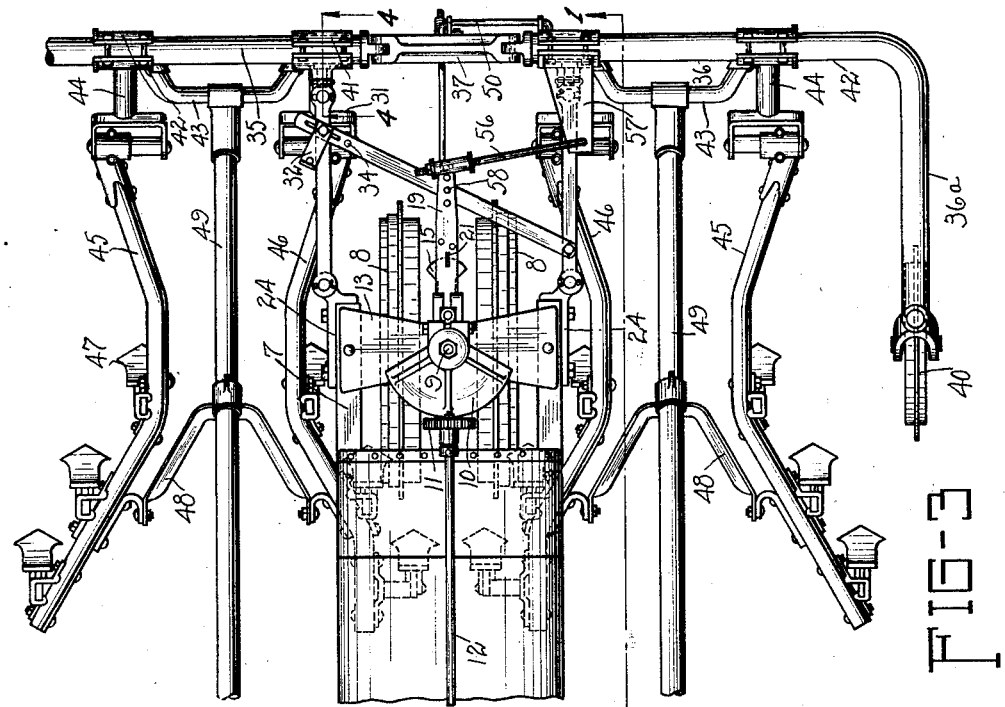
Fig. 3 is a partial plan view of the attachment shown in Figs. 1 and 2 as mounted on the forward portion of the tractor.
Figures 5, 6:
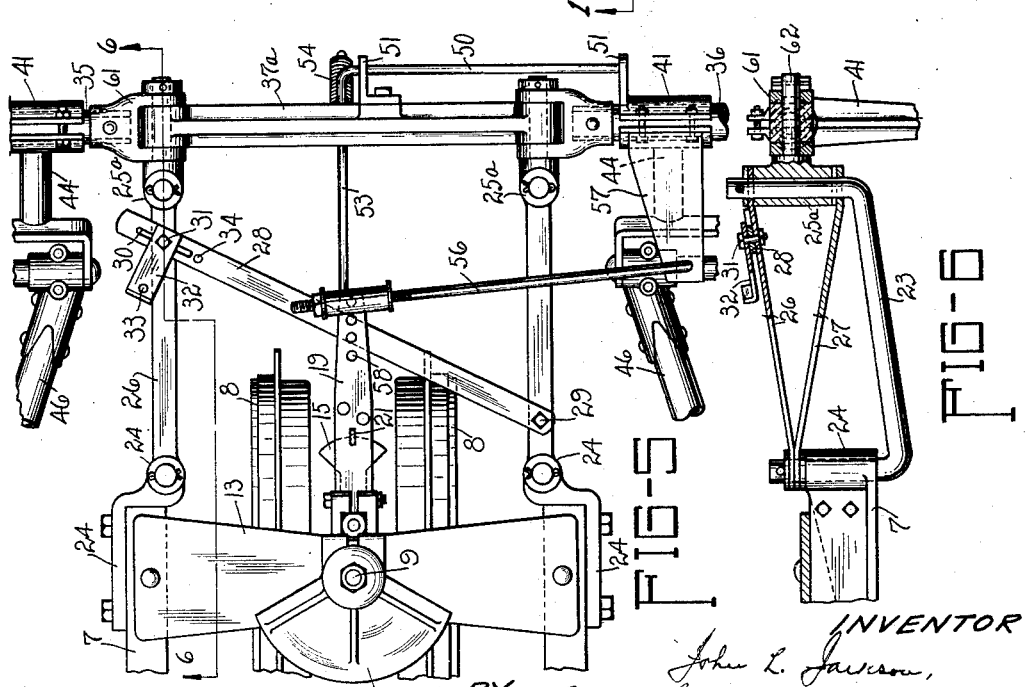

Fig. 5 is a partial plan view similar to Fig. 3, but showing a somewhat different arrangement of the connections between the forwardly extending supports and the transverse draft member, in that the intermediate link which connects the inner ends of the end portions of the draft member is also pivotally connected with the forwardly extending supports; and Fig. 6 is a detail, being a partial vertical section on line 6—6 of Fig. 5.

As the apparatus illustrated, in the main, follows rather closely the construction shown in the Benjamin Patent 1,539,108, referred to, a brief description of the corresponding parts will suffice, the novel features being pointed out more in detail.

Referring to the drawings,—7 indicates the forward portion of the frame of a tractor which, as has been suggested, is mounted on two steering wheels 8 set close together and provided with an upwardly extending spindle 9, as best shown in Figs. 3 and 5. This spindle is provided with a rearwardly extending toothed sector 10 that is operatively engaged by a gear 11 at the forward end of a shaft 12 which extends rearwardly and is arranged to be rotated by a manually operated steering wheel adjacent to the driver's seat. The tractor frame is provided at its front end with an inverted U-shaped bracket 13 that extends transversely thereof and provides a bearing for the upper end of the steering wheel spindle 9, as best shown in Fig. 1, and the sector 10 is located above the horizontal portion of this bracket. Keyed to the spindle 9 above the forward portion of the tractor frame is a sleeve 14 provided with a forwardly extending sector 15 having a centrally located notch 16 in its forward margin, as shown in Fig. 1. Also mounted on the spindle 9 at a point above the sleeve 14 is a sleeve 17 having a forwardly extending lip 18 to which is secured a forwardly extending bar 19. This bar is provided on its under side with a Z-shaped bracket 20 that extends rearwardly and under the forward marginal portion of the sector 15, and it supports a latch 21 that is adapted to engage the notch 16 to lock the bar 19 to the sector 15 so as to hold them in fixed relation to each other. A spring 22 normally holds the latch 21 in engagement with the notch 16 and thereby holds the bar 19 fixed with relation to the spindle 9 so that said bar swings laterally when said spindle is turned in steering the tractor.

Extending forwardly from the opposite sides of the front portion of the tractor frame are two U-shaped supports 23 the upturned rear ends of which are journaled in vertical bearings carried by brackets 24 secured to the opposite sides of the tractor frame, as shown in Figs. 1 and 3. The forward ends of the supports 23 are also upturned and journaled in vertical bearings provided by brackets 25 to which the draft member is pivotally connected as hereinafter described. Bracing links 26, 27 are connected at their rear ends with the upper portions of the upturned ends of the supports 23, and at their forward ends are connected with the forward upturned ends of said supports at points respectively above and below the brackets 25, as best shown in Fig. 1. A diagonal bar 28 is connected by a pivot 29 with the rear portion of one of the links 26, and at its other end is provided with a slot 30 that receives a pivot bolt 31 carried by the other link 26 near its forward end. The slot 30 is to permit limited lateral swinging movement of the supports 23 in unison with each other. A locking plate 32 pivoted on the bolt 31 and having a pin 33 adapted to enter a hole 34 in the bar 28 when said plate is swung around to the proper position, serves to lock the supports 23 against lateral swinging movement, and thereby hold the draft bar hereinafter described against endwise movement when it is disconnected from the steering wheels, as will be hereinafter described. From the foregoing description it will be seen that the two supports 23 with the links 26, 27 and brackets 25 constitute a stable laterally swinging support that extends forward from the tractor frame, which support normally has a range of lateral movement limited by the length of the slot 30, but may be locked against lateral swinging by means of the locking plate 32 and diagonal bar 28.

The draft element is in the form of an articulated bar or tube comprising end members 35, 36, the inner ends of which, in the form shown in Figs. 1 and 4, are connected together by an intermediate link 37, by means of horizontal pivots 38, as best shown in Fig. 2. The inner end portions of the draft members 35, 36 are pivotally connected to the brackets 25, respectively, by forwardly extending horizontal pivot studs 39, best shown in Fig. 4, in such manner that the outer ends of the members 35, 36 may swing up and down about the studs 39 as axes. The outer ends of the members 35, 36 are bent backward and downward as shown at 36ª in Fig. 3, and are provided with ground engaging supports, preferably in the form of caster wheels 40. Thus the outer portions of the draft members 35, 36 may move up and down, independently of each other and of the supports 23, in response to variations in the level of the ground. The intermediate link 37 holds the members 35, 36 against independent endwise movement, but does not interfere with their up and down movement with respect to each other.

By reference to Figs. 2 and 4 it will be seen that each of the draft members is provided near its ends with two depending arms 41, 42 which serve as hangers to support a spreader arch 43 having outturned lower ends which fit in bearings in the lower ends of said hangers. Connected with the lower ends of each spreader arch are draft brackets 44 to which are pivotally connected the forward ends of cultivator beams 45, 46 which carry shovels 47. A pair of cultivator beams is provided at each side of the front portion of the tractor so that the machine is adapted to cultivate two rows at the same time.

The rear portions of the cultivator beams of each pair are connected by a rear spreader arch 48, and a lifting bar 49 is connected with the central portion of each spreader arch 43 and extends back to a point where it may be conveniently manipulated by the operator either through a suitable lever connection or otherwise. By means of the lifting bar 49 the beams connected with it may be swung up or down about their connection with the draft brackets 44. The operation of lifting the cultivator beams rocks the front spreader arches 43 and serves to disconnect the forwardly extending bar 19 from the spindle 9 of the steering wheels in the manner described in said Benjamin patents. The means for that purpose comprises a bail 50 that extends longitudinally of the draft member and is mounted in brackets 51 carried by the members 36, 37 thereof, said bail having a depending arm 52 that extends in front of one of the vertical arms of one of the front arches 43, as shown in Figs. 1 and 3, the arrangement being such that when such front arch is rocked by the lifting of the beams connected with it it will swing the arm 52 forward. This arm is connected by a rod 53 with the latch 21 so that when said arm is swung forward said latch will be moved out of the notch 16 in the sector 15, thereby freeing the arm 19 from the steering spindle 9. A spring 54 on the rod 53 adapted to be compressed by an arm 55 on the bail 50 when its arm 52 is swung forward, tends to move the arm 52 back to its normal position when the cultivator beams are lowered. Thus the act of raising the beams out of operative position frees the arm 19 from its operative connection with the steering wheels.

The arm 19 is connected with the draft bar by a connecting rod 56 which is swiveled at its inner end to the arm 19 and at its outer end is connected to a plate 57 that extends rearwardly from one of the hangers 41 and is fixedly connected thereto. Consequently, lateral swinging of the arm 19 moves the draft element as a whole endwise. The extent of such movement may be varied by shifting the position of the inner end of the rod 56 along the rod 19, for which purpose a series of holes 58 are provided, as shown in Fig. 3.

The pivotal connection of the brackets 25 with the end portions of the draft element, in the arrangement shown in Figs. 1 to 4, is best made by providing each of the studs 39 with a head 59 which lies in a recess in the appropriate hanger 41, as best shown in Fig. 4, the opposite end of the stud being secured to the bracket by a pin 60. The upper end of the hanger is clamped on the tubular draft member 35 as shown in said figure. Thus the draft member may turn about the stud 37 as an axis to permit its outer end to rise and fall independently of the forwardly extending support.

In the arrangement shown in Figs. 5 and 6, an intermediate link 37ª is provided, which is somewhat longer than the link 37, and instead of extending the inner ends of the end portions 35, 36 of the draft member beyond the pivotal supports thereof, as shown in Figs. 1 to 3, said draft members are provided at their inner ends with yokes 61 which are pivoted on pivot pins 62 that extend forwardly from brackets 25ª similar in function to the brackets 25. The ends of the link 37ª are pivoted on the same pivots.

This construction is preferable to that shown in Figs. 1 to 4 because with it the position of the link 37ª is not affected by rising and falling movements of the end portions of the draft member. Furthermore, it is capable of being used for a three-row cultivator attachment in connection with a four-wheeled tractor, since in that case a pair of cultivator rigs could be attached to the intermediate link 37ª in a manner similar to that in which the outside pairs of rigs are attached to the end portions of the draft element. Also, with the construction shown in Figs. 5 and 6, the end portion of the draft member at the left hand side of the tractor in said figures could be removed without affecting the function of the draft member at the opposite side of the tractor, thus providing for converting a three-row cultivator into a two-row cultivator where the complete implement forms a three-row cultivator.

It is manifest that the construction described provides a support for the transverse draft element, that is adapted to be connected with the forward portion of the tractor frame to swing laterally, and as the parallel members of said support do not swivel with respect to each other or to the tractor, the support as a whole is a stable one that holds the draft element properly in its operative position. The end portions of the draft element being pivotally connected to the forward end portions of the support to turn about vertical and longitudinal axes, maintain their position at right angles to the longitudinal axis of the tractor notwithstanding lateral swinging of the support, and are also capable of swinging vertically independently of the support so that the cultivator beams and shovels more readily adapt themselves to unevenness in the ground.

If desired the members of the support may be locked in fixed relation to each other and to the tractor,—i. e.,—against lateral swinging, without interfering with the vertical swinging of the end portions of the draft element, in which case, by disconnecting the support from the steering wheels, the implement may be used without lateral shifting of the rigs in conjunction with the steering of the tractor, as is sometimes preferable.

The caster wheels, or equivalent ground engaging means, at the outer ends of the end portions of the draft element run on the ground surface and consequently cause such end portions to move up or down in response to the travel of said wheels over elevations or depressions.

What I claim as my invention and desire to secure by Letters Patent, is—

1. The combination with a tractor, of a forwardly extending support mounted on the tractor to swing laterally, a transversely disposed draft element mounted on said support to swing laterally therewith in a right line and pivotally connected with said support to swing vertically thereon, implement tools connected with said draft element, and means for controlling the lateral position of said support.

2. The combination with a tractor, of a forwardly extending support mounted on the tractor to swing laterally, a transversely disposed draft element mounted adjacent to its inner end on said support to swing laterally therewith in a right line, and pivotally connected with said support to swing vertically thereon, implement tools connected with said draft element, means for controlling the lateral position of said support, and ground engaging means supporting the outer end portion of said draft element.

3. The combination with a tractor having front steering means, of a forwardly extending support mounted on the tractor to swing laterally, a transversely disposed draft element mounted on said support to swing laterally therewith in a right line, and pivotally connected with said support to swing vertically thereon, implement tools connected with said draft element, and means for moving said support laterally in conjunction with steering movements of said steering means.

4. The combination with a tractor, of a forwardly extending support mounted on the tractor to swing laterally, a transversely disposed draft element mounted on said support to swing laterally therewith in a right line, and pivotally connected with said support to swing vertically thereon, implement tools connected with said draft element, means for controlling the lateral position of said support, and means for securing said support in fixed relation to the tractor.

5. The combination with a tractor, of a forwardly extending support mounted on the tractor to swing laterally, a transversely disposed draft element mounted on said support to swing laterally therewith in a right line, and pivotally connected with said support to swing vertically thereon, implement tools connected with said draft element, means for controlling the lateral position of said support, means for securing said support in fixed relation to the tractor, and ground engaging supporting means for the outer end portion of said draft element.

6. The combination with a tractor having front steering means, of a forwardly extending support mounted on the tractor to swing laterally, a transversely disposed draft element mounted on said support to swing laterally therewith in a right line, and pivotally connected with said support to swing vertically thereon, implement tools connected with said draft element, means for moving said support laterally in conjunction with steering movements of said steering means, a releasable connection between said steering means and said support for causing said support to move laterally in conjunction with steering movements of said steering means, and means for holding said support in fixed relation to the tractor.

7. The combination with a tractor, of supporting means mounted on the tractor to swing laterally and extending forwardly thereof, opposite transversely extending draft members pivotally connected adjacent to their inner ends with said supporting means to swing about vertical axes, and also to swing vertically about their pivotal connections with said supporting means, implement tools connected with said draft members, respectively, at opposite sides of said supporting means, and means for controlling the lateral movement of said support.

8. The combination with a tractor, of supporting means mounted on the tractor to swing laterally and extending forwardly thereof, opposite transversely extending draft members pivotally connected adjacent to their inner ends with said supporting means to swing about vertical axes, and also to swing vertically about their pivotal connections with said supporting means, implement tools connected with said draft members respectively, at opposite sides of said supporting means, means for controlling the lateral movement of said support, and ground engaging means supporting the outer end portions of said draft members.

9. The combination with a tractor, of supporting means mounted on the tractor to swing laterally and extending forwardly thereof, opposite transversely extending draft members pivotally connected adjacent to their inner ends with said supporting means to swing about vertical axes, and also to swing vertically about their pivotal connections with said supporting means, implement tools connected with said draft members, respectively, at opposite sides of said supporting means, means for controlling the lateral movement of said support, and means for securing said support in fixed relation to the tractor.

10. An attachment for tractors comprising a support adapted to be connected with the front portion of a tractor to extend forwardly therefrom and to swing laterally with respect thereto, a transversely disposed draft member pivotally connected with said support to swing vertically about its pivotal connection thereto, means for controlling the lateral position of said support, and implement tools connected with said draft member at one side of said support.

11. An attachment for tractors comprising a support adapted to be connected with the front portion of a tractor to extend forwardly therefrom and to swing laterally with respect thereto, a transversely disposed draft member pivotally connected with said support to swing vertically about its pivotal connection thereto, means for controlling the lateral position of said support, implement tools connected with said draft member at one side of said support, and means for securing said support in fixed relation to the tractor.

12. An attachment for tractors comprising a support adapted to be connected with the front portion of a tractor to extend forwardly therefrom and to swing laterally with respect thereto, a transversely disposed draft member pivotally connected with said support to swing vertically about its pivotal connection thereto, means for controlling the lateral position of said support, implement tools connected with said draft member at one side of said support, and ground engaging means supporting the outer end portion of said draft member.

13. An attachment for tractors comprising two parallel supporting members adapted to be connected with the front portion of a tractor to extend forwardly therefrom and to swing laterally with respect thereto, transversely extending draft members pivotally connected with said supporting members to swing about vertical axes and also to swing vertically about their pivotal connections to said supporting members, means for holding said supporting members in parallel relation to each other, means for controlling the swinging movement of said supporting members, and implement tools carried by said draft members.

14. An attachment for tractors comprising two parallel supporting members adapted to be connected with the front portion of a tractor to extend forwardly therefrom and to swing laterally with respect thereto, transversely extending draft members pivotally connected with said supporting members to swing about vertical axes and also to swing vertically about their pivotal connections to said supporting members, means for holding said supporting members in parallel relation to each other, implement tools carried by said draft members, means for controlling the swinging movement of said supporting members, and means for holding said supporting members against swinging.

15. An attachment for tractors comprising two parallel supporting members adapted to be connected to the front portion of a tractor to extend forwardly therefrom and to swing laterally with respect thereto, transversely extending draft members pivotally connected adjacent their inner ends with said supporting members to swing about vertical axes and also to swing vertically about their pivotal connections with said supporting members, an intermediate member connected with said supporting members to hold said draft members in spaced relation to each other, means for controlling the swinging movement of said supporting members, means for holding said supporting members against swinging, and implement tools carried by said draft members.

16. An attachment for tractors comprising two parallel supporting members adapted to be connected to the front portion of a tractor to extend forwardly therefrom and to swing laterally with respect thereto, transversely extending draft members pivotally connected adjacent their inner ends with said supporting members to swing about vertical axes and also to swing vertically about their pivotal connections with said supporting members, an intermediate member connected with said supporting members to hold said draft members in spaced relation to each other, means for controlling the swinging movement of said supporting members, means for holding said supporting members against swinging, implement tools carried by said draft members, and ground engaging supports for the outer end portions of said draft members.

17. The combination with a tractor, of a support mounted on the tractor to swing laterally, a transversely disposed draft element mounted on said support to swing laterally therewith and pivotally connected with said support to swing vertically thereon, and implement tools connected with said draft element.

18. The combination with a tractor, of a support mounted on the tractor to swing laterally, a transversely disposed draft element mounted on said support to swing laterally therewith in a right line and pivotally connected with said support to swing vertically thereon, implement tools connected with said draft element, and means for controlling the lateral position of said support.

19. The combination with a tractor, of a support mounted on the tractor to swing laterally, a transversely disposed draft element mounted on said support to swing laterally therewith and pivotally connected with said support to swing vertically thereon, implement tools connected with said draft element, and ground engaging means supporting the outer end portion of said draft element.

20. The combination with a tractor having steering means, of a support mounted on the tractor to swing laterally, a transversely disposed draft element mounted on said support to swing laterally therewith and pivotally connected with said support to swing vertically thereon, implement tools connected with said draft element, and means for moving said support laterally in conjunction with steering movement of said steering means.

21. The combination with a tractor having steering means, of a support mounted on the tractor to swing laterally, a transversely disposed draft element mounted on said support to swing laterally therewith and pivotally connected with said support to swing vertically thereon, implement tools connected with said draft element, means for moving said support laterally in conjunction with steering movement of said steering means, and means for securing said support in fixed relation to the tractor.

22. The combination with a tractor, of supporting means mounted thereon to swing laterally, opposite transversely extending draft members pivotally connected adjacent to their inner ends with said supporting means to swing about vertical axes, and also to swing vertically about their pivotal connections with said supporting means, implement tools connected with said draft members respectively at opposite sides of said supporting means, means for controlling the lateral movement of said support, and ground engaging means supporting the outer end portions of said draft members.

23. An attachment for tractors comprising a support adapted to be connected with a tractor to swing laterally with respect thereto, a transversely disposed draft member pivotally connected with said support to swing vertically about its pivotal connection thereto, means for controlling the lateral position of said support, and implement tools connected with said draft member at one side of said support.

24. An attachment for tractors comprising a support adapted to be connected therewith to swing laterally with respect thereto, a transversely disposed draft member pivotally connected with said support to swing about a vertical axis and also to swing vertically about its pivotal connection with said support, means for controlling the lateral position of said support, and implement tools connected with said draft member.

25. An attachment for tractors comprising a support adapted to be connected therewith to swing laterally with respect thereto, a transversely disposed draft member pivotally connected with said support to swing about a vertical axis and also to swing vertically about its pivotal connection with said support, means for controlling the lateral position of said support, implement tools connected with said draft member, and ground engaging means supporting the outer end portion of said draft member.

26. An attachment for tractors comprising two parallel supporting members adapted to be connected with a tractor to swing laterally with respect thereto, transversely extending draft members pivotally connected with said supporting members to swing about vertical axes, and also to swing vertically about their pivotal connections with said supporting members, means for holding said supporting members in parallel relation to each other, means for controlling the swinging movement of said supporting members, and implement tools carried by said draft members.

In witness whereof I hereunto subscribe my name this 4th day of January, 1930.

JOHN L. JACKSON.